(12) United States Patent
Laurisch et al.

(10) Patent No.: US 9,073,141 B2
(45) Date of Patent: Jul. 7, 2015

(54) ELECTRODE FOR PLASMA CUTTING TORCHES AND USE OF SAME

(71) Applicant: Kjellberg-Stiftung, Gießen (DE)

(72) Inventors: Frank Laurisch, Finsterwalde (DE); Volker Krink, Finsterwalde (DE)

(73) Assignee: Kjellberg-Stiftung (DE)

( * ) Notice: Subject to any disclaimer, the term of this patent is extended or adjusted under 35 U.S.C. 154(b) by 101 days.

(21) Appl. No.: 13/899,635

(22) Filed: May 22, 2013

(65) Prior Publication Data

US 2013/0313231 A1 Nov. 28, 2013

(30) Foreign Application Priority Data

May 24, 2012 (EP) ..................................... 12169342

(51) Int. Cl.
*B23K 10/00* (2006.01)
*H05H 1/34* (2006.01)

(52) U.S. Cl.
CPC .................. *B23K 10/00* (2013.01); *H05H 1/34* (2013.01); *H05H 2001/3442* (2013.01); *H05H 2001/3478* (2013.01)

(58) Field of Classification Search
CPC ............ H05H 1/34; H05H 2001/3442; H05H 2001/3478
USPC ........................... 219/121.52, 121.48, 75, 119
See application file for complete search history.

(56) References Cited

U.S. PATENT DOCUMENTS

| | | | |
|---|---|---|---|
| 3,030,490 A * | 4/1962 | Reed ................................ | 219/75 |
| 4,675,493 A | 6/1987 | Gartland et al. | |
| 5,624,586 A * | 4/1997 | Sobr et al. ................. | 219/121.48 |
| 5,726,414 A | 3/1998 | Kitahashi et al. | |
| 6,099,915 A | 8/2000 | Dvorak | |
| 7,132,619 B2 * | 11/2006 | Conway et al. .......... | 219/121.52 |
| 8,575,510 B2 | 11/2013 | Laurisch et al. | |
| 2002/0144982 A1 | 10/2002 | Chancey et al. | |
| 2006/0102598 A1 * | 5/2006 | Twarog et al. ........... | 219/121.52 |
| 2007/0125755 A1 * | 6/2007 | Mather et al. ............ | 219/121.52 |

FOREIGN PATENT DOCUMENTS

| | | |
|---|---|---|
| DE | 29905658 U1 | 7/1999 |
| DE | 10144516 A1 | 4/2003 |

(Continued)

OTHER PUBLICATIONS

"European Application No. 12169342.8, English Translation of European Search Report dated Oct. 26, 2012", 6 pgs.

(Continued)

*Primary Examiner* — Mark Paschall
(74) *Attorney, Agent, or Firm* — Schwegman Lundberg & Woessner, P.A.

(57) ABSTRACT

The invention relates to an electrode for plasma torches for plasma cutting and to a use of the electrode for said plasma torch. The electrode in accordance with the invention for plasma cutting torches is formed from an electrode holder and from an emission insert which are connected to one another in a force-fitted and/or shape-matched manner. The emission insert has at least one section along its longitudinal axis which is arranged between two other sections or next to a section which has a reduced outer diameter in a rotationally symmetrical design of the emission insert or has a reduced cross-sectional surface in a non-rotationally symmetrical emission insert with respect to the other section(s).

15 Claims, 9 Drawing Sheets

(56) References Cited

FOREIGN PATENT DOCUMENTS

| | | |
|---|---|---|
| DE | 102008018530 A1 | 10/2009 |
| DE | 102008018530 B4 | 4/2010 |

OTHER PUBLICATIONS

"European Application No. 12169342.8, European Search Report dated Oct. 26, 2012", 6 pgs.

* cited by examiner

ELECTRODE FOR PLASMA CUTTING TORCHES AND USE OF SAME

CLAIM OF PRIORITY

This application claims the benefit of priority of European Patent Application Serial No. 12 169 342.8, entitled "ELECTRODE FOR PLASMA CUTTING TORCHES AND USE OF SAME," filed on May 24, 2012, the benefit of priority of which is claimed hereby, and which is incorporated by reference herein in its entirety.

TECHNICAL FIELD

The disclosure relates to an electrode for plasma torches for plasma cutting and to a use of the electrode for said plasma torch.

BACKGROUND

A plasma is a thermally highly heated electrically conductive gas that is composed of positive and negative ions, electrons and excited and neutral atoms and molecules.

Various gases, e.g., monatomic argon and/or the diatomic gases hydrogen, nitrogen, oxygen or air are used as a plasma gas. These gases ionize and dissociate by the energy of the plasma arc.

The parameters of the plasma jet can be highly influenced by the design of the nozzle and of the electrode. These parameters of the plasma jet are e.g. the jet diameter, the temperature, the energy density and the flow speed of the gas.

In plasma cutting, the plasma is usually constricted by a nozzle which may be gas-cooled or water-cooled. Energy densities of up to $2 \times 10^6$ W/cm$^2$ can thereby be achieved. Temperatures arise in the plasma jet of up to 30,000° C. which allow very high cutting speeds at all electrically conductive materials in combination with the high flow speed of the gas.

SUMMARY

In an example, a plasma torch substantially comprises a plasma torch head 1, an electrode 7 and a nozzle 4; further components can be an electrode mount 6 for fixing the electrode 7, a nozzle holder 5 and a nozzle cap 2 for fixing the nozzle 4. The plasma gas PG is supplied into the space between the electrode 7 and the nozzle 4 through the plasma gas guide 3 and ultimately flows through the nozzle passage 4.1 through the nozzle 4.

A plasma torch can additionally have a protective nozzle cap 9 and a secondary gas guide 9.1 via which a secondary gas SG is supplied to the plasma jet. The nozzle 4 and the electrode 7 can be cooled with a liquid coolant, e.g. water.

Plasma cutting can be used for cutting electrically conductive materials, with different gases and gas mixtures being used in dependence on the cutting work.

Different electrodes 7 and nozzles 4 are then used for this purpose. They are subject to wear during the operation of the plasma torch and then have to be replaced. To be able to use a plasma torch for different gases or gas mixtures, the plasma torches, electrodes 7 and nozzles 4 are configured so that a plasma torch can be used for different gases by the replacement of the electrodes 7 and nozzles 4.

Electrodes 7 comprise an electrode holder 7.1 and an emission insert 7.2. It is generally possible to distinguish between two design forms. When cutting with plasma gases containing oxygen, a so-called flat electrode is used, i.e. the emission insert 7.1—with the exception of its front emission surface—is located in the electrode holder 7.1. The emission insert 7.2 comprises hafnium or zirconium. Materials which have good current conductivity and thermal conductivity such as e.g. copper or silver are used for electrode holders 7.1. In electrodes 7 for cutting with gases or gas mixtures not containing oxygen, e.g. argon, hydrogen, nitrogen, tungsten is used, often with doping amounts (e.g. of lanthanum), as the material for the emission insert 7.2. It is then fastened in the electrode holder 7.1, but, in contrast to the flat electrode, projects out of it and is often called a point electrode.

Figure 1:
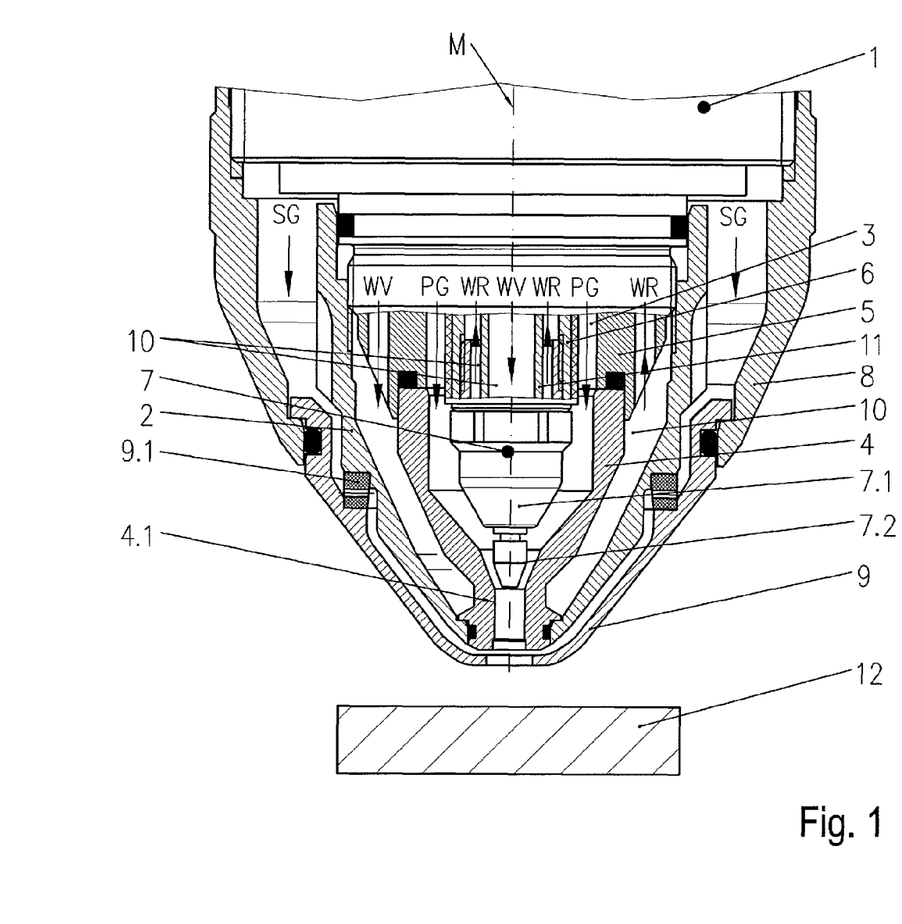
FIG. 1 a sectional representation through a plasma torch in which an example of an electrode in accordance with the disclosure has been inserted.

Such a design can also be seen from FIG. 1, with an example of an electrode in accordance with the invention also already being shown here.

An electrode is discussed in DE 101 44 516 A1. There, an electrode is fastened in a holder and the tip of the electrode projects into a nozzle antechamber. The electrode material is composed of tungsten and is pressed into a holder of electrically conductive material, preferably copper or silver. The holders are water-cooled to realize an effective heat dissipation.

A plasma torch having a plasma gas feed and a secondary gas feed as well as a nozzle and a point electrode is also described in DE 10 2008 018 530 B4. The electrode is composed of an electrode holder and an electrode insert; the electrode insert projects from the electrode holder. In this technical solution, the main focus is, however, on the improvement of the cooling of the nozzle.

In these arrangements, there is the problem that the service life of the electrode and the cutting quality is often not sufficient.

On the one hand, the electrodes must be well cooled; but a high temperature at the emission surface must nevertheless be achieved to achieve a secure emission of the electrons for the forming of an arc. The emission should take place as uniformly as possible over a surface, which is in turn positive for the service life. The emission temperature should be reached in as short a time as possible after the ignition of the arc.

In addition, the electrode should be designed so that a plasma torch can be reequipped as easily as possible between the used plasma gases. A further demand is a high centricity between the emission insert and the nozzle. This results in better cutting results and in an extended service life.

It can therefore an object of the invention to provide electrodes for plasma torches which can preferably be used for plasma cutting, which achieve an increased service life and which simultaneously have an improved response behavior after the ignition of an arc up to the reaching of a temperature suitable for the emission of electrodes.

The electrode in accordance with the disclosure for plasma cutting torches is formed from an electrode holder and from an emission insert which are connected to one another in a force-fitted and/or shape-matched manner. The emission insert has at least two sections along its longitudinal axis. In this respect, at least one section, which is arranged next to one section or between two sections, has a reduced outer diameter with a rotationally symmetrical design of the emission insert or a reduced cross-sectional surface with a non-rotationally symmetrical emission insert with respect to other sections.

The at least one section with a reduced outer diameter or reduced cross-sectional surface can be configured in the form of a groove-like recess preferably running around radially over the total outer jacket surface.

The cross-sectional surface is likewise reduced in the region of the at least one section with a reduced outer diameter or a reduced cross-sectional surface by such a design of the emission insert. The electrical current flow is thereby increased in this region so that a heating of the emission insert takes place in a shorter time with respect to a comparable electrical power which can be achieved with an electrode without such a section.

Since a further section directly adjoins a section with a reduced outer diameter or with a reduced cross-sectional surface in the direction of a workpiece to be machined, said further section having a larger diameter or a larger cross-sectional surface at at least one margin of the section with a reduced outer diameter or a reduced cross-sectional surface, a correspondingly larger surface is available there for the emission of electrons, which has an additionally positive effect in the plasma cutting process.

A section that is arranged subsequent to the section with a reduced outer diameter or a reduced cross-sectional surface in the direction of a workpiece to be cut can be conically tapered in the direction of the workpiece. This may be the case over its total length. However, only a part section or a further section which is arranged in the direction of the workpiece can be conically tapered.

However, a section which has a constant outer diameter or a constant cross-sectional surface can also be arranged between the section with a reduced outer diameter or a reduced cross-sectional surface and a conically tapering section. At least one further section which is conically tapering can be present at such a section. This section can then form the tip of the electrode.

The tip of the emission insert facing in the direction of a workpiece to be machined can be conical, pyramidic or have the form of a truncated cone or of a truncated pyramid.

An emission insert in the form of a truncated cone or of a truncated pyramid in the direction of a workpiece to be machined has an end surface in the form of a circular surface or of a polygon and arranged in the direction of the tool. The end face should be smaller than all other outer diameters or cross-sectional surfaces of all sections present at the emission insert.

The section with a reduced outer diameter or reduced cross-sectional surface can be formed as a recess in the form of a rectangle, a trapezoid, a part circle or a wedge.

At least one hollow space in and/or through which coolant can be conducted can be formed in the electrode holder of an electrode in accordance with the invention.

The electrode holder should be formed from a material having good electrical conductivity and thermal conductivity, preferably from Ag or Cu or from an alloy thereof. Tungsten or a tungsten alloy or hafnium or a hafnium alloy having a melting temperature>2000° C. can used as a material for the emission insert (7.2).

The section with a reduced outer diameter or a reduced cross-sectional surface, which is in the form of a groove-like recess with a reduced outer diameter or a reduced cross-sectional surface, should be at least 20% smaller than an outer diameter or a cross-sectional surface of a section arranged directly next to the section with a reduced outer diameter or a reduced cross-sectional surface.

The emission insert should comprise solid material and no inner bore or no throughgoing passage.

The emission insert should preferably be connected to the electrode holder by means of a press fit. The press fit can be combined with a connection with material continuity, preferably a solder connection.

An electrode in accordance with the invention can be used at a plasma torch, with the plasma torch being configured with at least one plasma torch head having an electrode formed from the electrode holder and the emission insert, having a nozzle and a gas feed for plasma gas and with a section being present with a reduced outer diameter or a reduced cross-sectional surface with respect to at least two sections arranged next to the section.

The outer diameter of the emission insert can be in the range from 1.5 mm to 6 mm. The outer diameter of the electrode holder should be correspondingly larger.

In another respect, the plasma torch can be configured in a conventional form having various modifications, which can relate to a secondary gas feed or a nozzle space, for example. The electrode can be arranged within a nozzle space.

BRIEF DESCRIPTION OF THE DRAWINGS

The disclosure will be explained in more detail with reference to examples in the following. In this respect, the features which can be seen from the examples can be combined with one another in the most varied form. They are not simply restricted to the respective example.

There are shown:

FIGS. 3.1-3.3 three examples of electrodes in accordance with the disclosure;

FIGS. 4.1-4.8. six further examples of electrodes in accordance with the disclosure;

DETAILED DESCRIPTION

The plasma torch shown in FIG. 1 comprises at least one plasma torch head 1 having an electrode 7, a nozzle 4 and a gas feed 3 for the plasma gas PG.

Figure 4:
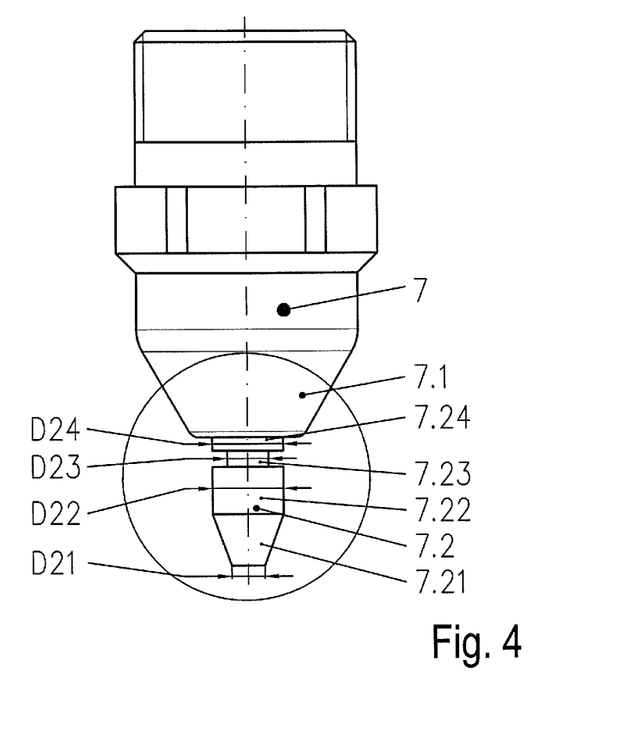
FIG. 4 a further example of an electrode in accordance with the disclosure.

The electrode 7 comprises an electrode holder 7.1 and an emission insert 7.2, with the emission insert 7.2 of the electrode 7 comprising, viewed from the electrode holder 7.1, at least a section 7.23 and a section 7.21 tapering toward the torch tip and the smallest diameter of the section 7.23 being smaller than the largest diameter of the tapering section 7.21. Examples for this are shown in FIGS. 4, 4.1, 4.2, 4.3, 4.4, 4.5, 4.6, 5, 5.1, 5.2, 6, 6.1, 6.2, 6.3 and 6.4.

The electrode 7 is screwed into the electrode mount 6 by means of a thread and is cooled from inside by a cooling medium which is fed in via the interior of a cooling pipe 22 as a coolant header WV and conducted back via the space formed between the outside of the cooling pipe 11 and the electrode mount 6 as a coolant return WR.

The nozzle 4 is held by a nozzle cap 2 and a cooling medium which is fed in via the coolant header WV and conducted back via the coolant return WR flows between the nozzle 4 and the nozzle cap 2.

A protective nozzle cap 9 surrounds the nozzle 4 and the nozzle cap 2. The secondary gas SG flows therebetween which flows through the secondary gas guide 9.1 which simultaneously insulates the protective nozzle cap 9 from the nozzle cap 2 and keeps it at a distance. In this respect, the secondary gas guide 9.1 can be designed so that it allows the secondary gas SG to rotate. The protective nozzle cap 9 is fixed by a protective nozzle cap holder 8 which is fastened to the plasma torch head by means of a thread.

The plasma gas PG can be set into rotation by a plasma guide which is not shown here and which is arranged between the nozzle 4 and the electrode 5.

The electrode 7 comprises an electrode holder 7.1 and an emission insert 7.2. The emission insert 7.2 is fastened in the electrode holder 7.1; this can be carried out in force-fitting or shape-matching manner. A good heat transfer is thus achieved between the emission insert 7.2 and the electrode holder 7.1. The electrode holder 7.1 can be water-cooled, with it being able to have a hollow space in the interior through which the cooling water flows. The electrode holder 7.1 comprises a material of good thermal conductivity and electrical conductivity (Cu, Ag). Tungsten which can be provided with doping, e.g. lanthanum, is used for the emission insert 7.2.

At least one section 7.23 which is adjoined by a section 7.21 tapering toward the torch tip is present at the emission insert 72, viewed from the electrode holder 7.1. The cylindrical section 7.22 is arranged therebetween. The smallest outer diameter of the section 7.23 is in this respect smaller than the largest diameter of the section 7.22 or of a tapering section 7.21. The section 7.21 can have the shape of a truncated cone, a truncated pyramid, a cone or a pyramid.

The section 7.23 can form a groove-like recess which preferably runs radially around the total jacket surface of the electrode 7.

The emission insert 7.2 can also have a plurality of inserts.

One or more of the advantages named in the following can be achieved by a configuration of an emission insert 7.2 which has a section 7.23 with a reduced outer diameter or a reduced cross-sectional surface:
   increased electrical resistance and/or thermal resistance in the region of the section 7.23;
   thereby reaching a sufficiently high emission temperature with a simultaneously sufficiently large emission surface for the arc;
   additionally reaching the emission temperature of the emission insert in a shorter time with a simultaneously sufficiently large emission surface for the arc;
   no starting of the arc at one side on a part of the emission surface; thereby longer service life, better centricity of the arc and better cutting quality.

The process can run as follows in this respect:
   ignition takes place by high-voltage discharge or high-frequency discharge between the electrode and the nozzle and a pilot arc can thereby be ignited;
   the plasma jet exiting through the nozzle passage ionizes the path between the plasma torch and the workpiece;
   then the main arc can be formed between the electrode and the workpiece and the workpiece can be cut.

A high centricity is furthermore achievable with respect to collet chuck designs by the screwing in of the electrode 7. The structure of electrode holder 7.1 and emission insert 7.2 (e.g. by pressing or similar) is advantageous in this respect. An easy change between differently configured electrodes can thereby also take place.

Figure 2:
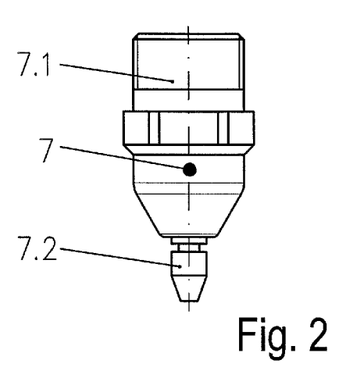
FIG. 2 an example of an electrode in accordance with the disclosure.

FIG. 2 shows in schematic form an example of an electrode 7 in accordance with the invention comprising an electrode holder 7.1 and an emission insert 7.2, with the electrode holder 7.1 having an external thread.

Figure 31:
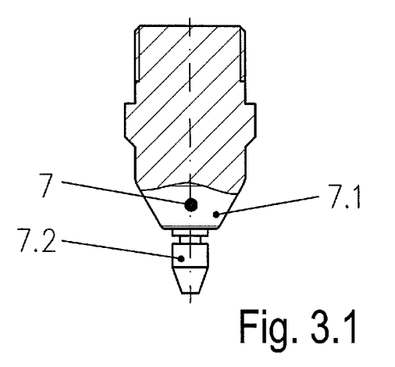

It can be seen from FIG. 3.1 that an electrode holder 7.1 is in solid form and can have an external thread by which the electrode 7 can be connected to the plasma torch.

Figure 32:
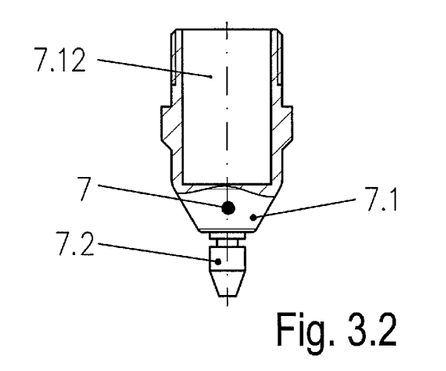
Figure 33:
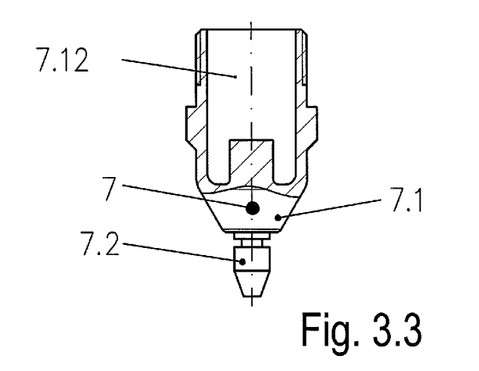

In the example shown in FIG. 3.2, a coolant space 7.12 is formed as a simple blind bore at the electrode holder 7.1. In the example shown in FIG. 3.3, the coolant space 7.12 has an advantageous design since a material accumulation having a sufficiently larger surface which can be used for the heat dissipation is present in the region in which the emission insert 7.2 is connected to the electrode holder 7.1.

Figure 41:
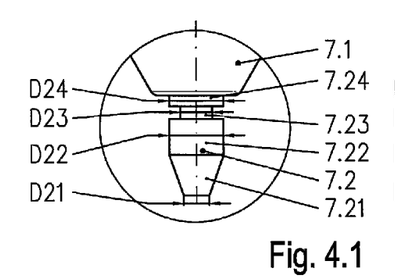

FIG. 4 and FIG. 4.1 show an electrode 7 such as can also be used in the plasma torch in accordance with FIG. 1. In this respect, the emission insert 7.2 is formed with a section 7.24 which projects out of the electrode holder 7.1. Section 7.23 with a reduced outer diameter D23 adjoins this section 7.24 in the direction of a workpiece (not shown) to be machined. This section 7.23 is followed by a cylindrical section 7.22 which is adjoined by the section 7.21 in the shape of a truncated cone tapering conically in the direction of the workpiece. The outer diameters D24 and D22 are of equal size and are larger than the outer diameter D23 of the section 7.23 in this example. The outer diameter D21 of the front end face, which is formed at section 7.21, is smaller than the outer diameter D23 and naturally also the outer diameter D22 and D24.

Figure 42:
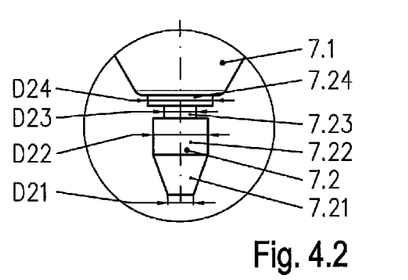

The example shown in FIG. 4.2 differs from the example in accordance with FIG. 4.1 in that the outer diameter D24 of the section 7.24 is larger than the outer diameter D22 of the section 7.22 and both outer diameters D22 and D24 are larger than the outer diameter D23 of section 7.23.

Figure 43:
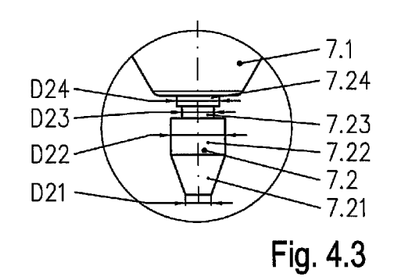

In the example shown in FIG. 4.3, the outer diameter relationships of the sections 7.22 and .24 are reversed. D22>D24>D23 applies.

Figure 44:
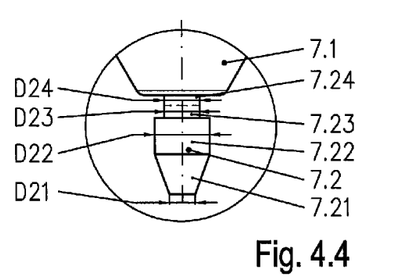

FIG. 4.4 shows an example in which the outer diameter sizes are selected so that D24=D23<D22. This means that the emission insert 7.2 with the outer diameter D23 of the section 7.23 is fastened in the electrode holder 7.1.

Figure 45:
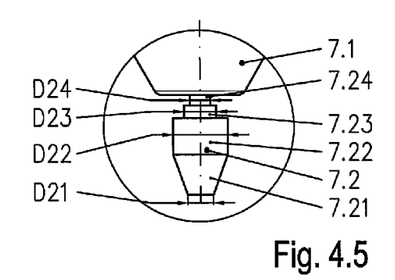

In the example shown in FIG. 4.5, the outer diameters of sections 7.24, 7.23 and 7.22 are selected so that D24<D23<D22. The smallest outer diameter is therefore present in the region 7.24 which is arranged directly beneath the electrode holder 7.1 and by which the emission insert 7.2 projects out of the electrode holder 7.1.

Figure 46:
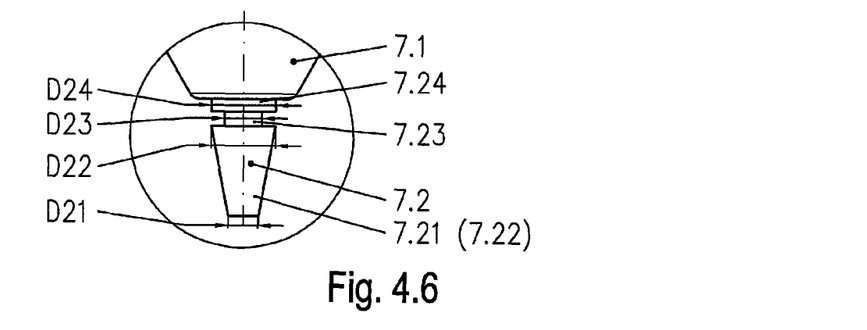

In the example shown in FIG. 4.6, the outer diameters are selected so that D24=D22>D23.

Figure 47:
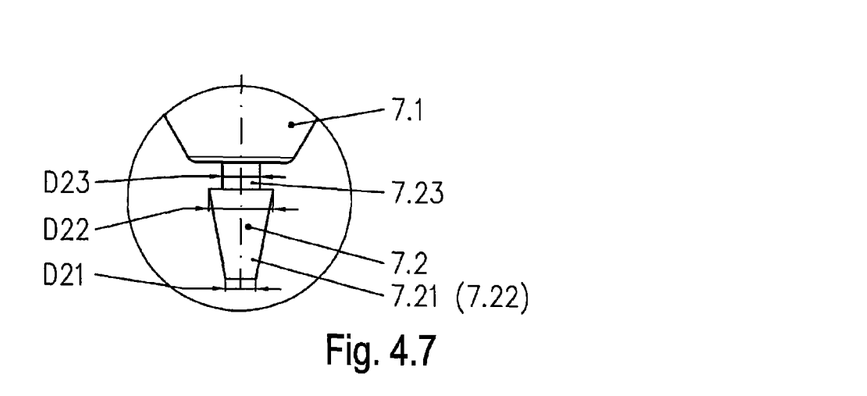

The example shown in FIG. 4.7 again only has one section 7.23 with a reduced outer diameter which is arranged directly behind the electrode holder 7.1 at the emission insert 7.2. Said electrode holder is adjoined by a section 7.21 which tapers conically in the direction of the workpiece 12 and whose largest outer diameter D22 is larger than the outer diameter D23 of the section 7.23. The end face of the emission insert 7.2 facing in the direction of a workpiece 12 to be machined has a circular shape and has an outer diameter D21 which is smaller than the outer diameter D23.

Figure 48:
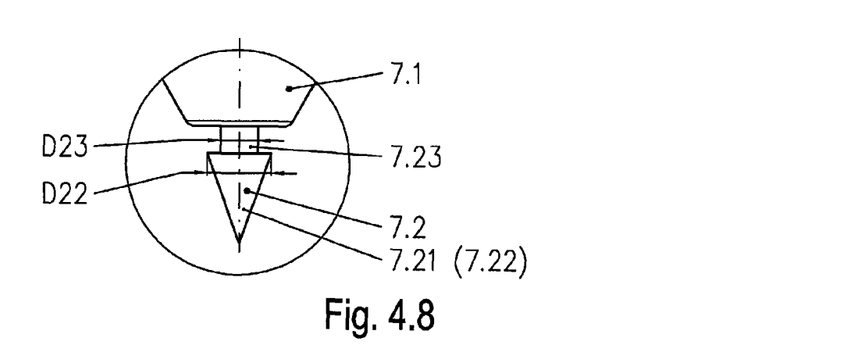

In this example and in the example shown in FIGS. 4.6 and 4.8, a further section 7.22 which can, however, be very short in the direction of the longitudinal axis of the emission insert 7.2 could also be present between the sections 7.23 and 7.21. Its outer diameter D22 can in this respect be the same size as the maximum outer diameter D21 of the section 7.21.

In the example in accordance with FIG. 4.8, the section 7.1 is conical and has a tip in the direction of the workpiece 12.

Figure 5:
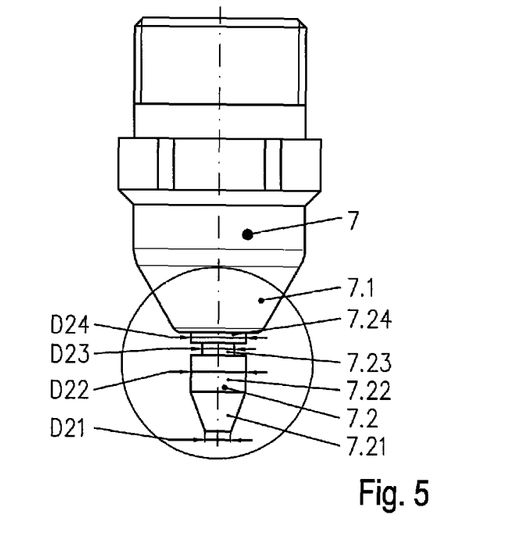
FIGS. 5, 5.1-5.2 three further examples of electrodes in accordance with the disclosure.
Figure 51:
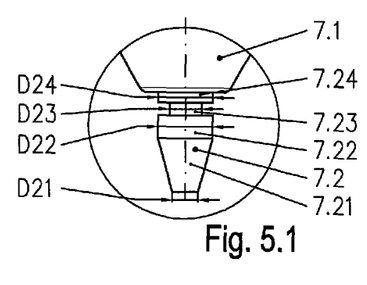

FIGS. 5 and 5.1 again show an electrode 7 with a section 7.21. in frustoconical form such as is the case in the example in accordance with FIG. 4.

Figure 52:
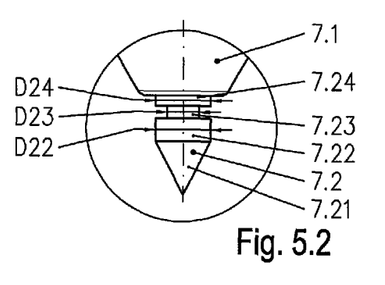

In the example in accordance with FIG. 5.2, the conical section 7.21 is conical with a tip at the end of the emission insert 7.2 facing in the direction of the workpiece.

Figure 6:
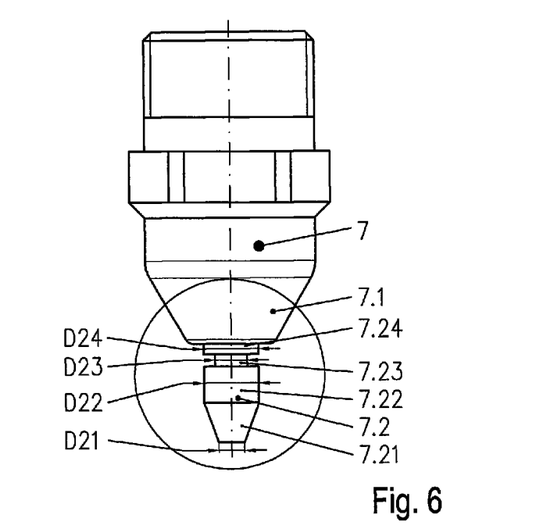
FIGS. 6-6.4 five further examples of electrodes in accordance with the disclosure

FIGS. 6 to 6.4 show examples with a differently formed section 7.23 with a reduced outer diameter.

The example in accordance with FIG. 6 again corresponds to the example in accordance with FIG. 4 and the section 7.23 with a reduced outer diameter has a rectangular cross-section.

Figure 61:
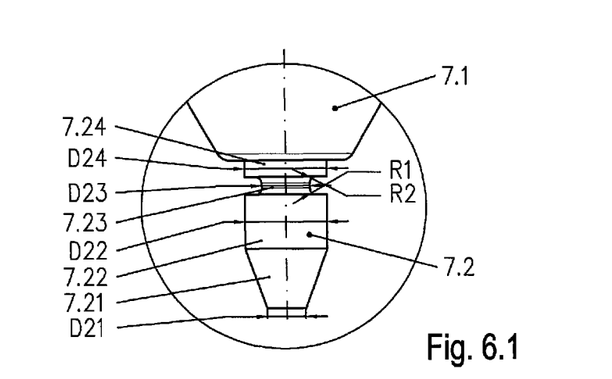
Figures 62, 63:
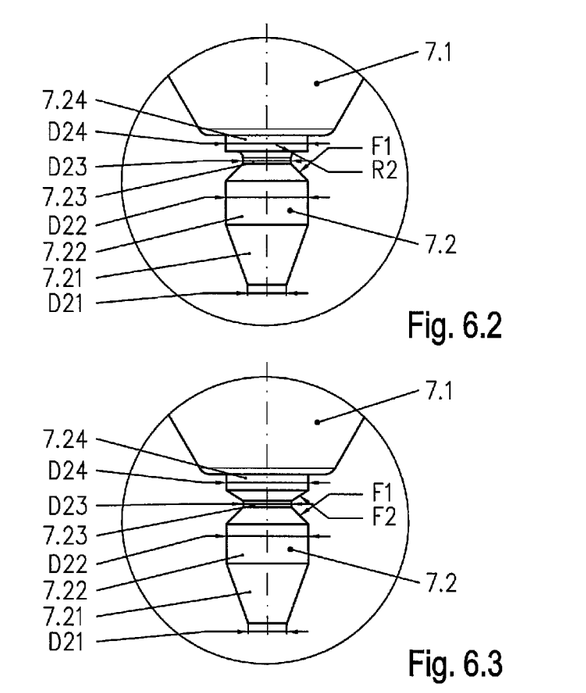

FIG. 6.1 shows an example in which the transition of sections 7.22 and 7.24 to section 7.23 is formed with the radii R1 and R2. In the example in accordance with FIG. 6.2, the transition of the section 7.23 to the section 7.22 is configured with a chamfer F1 and the outer diameter of the section 7.23 is configured with the radius R2 so that an outer contour of part circle shape of the section 7.23 is formed which differs from the previously described rectangular form.

In the example shown in FIG. 6.3, the transitions of section 7.23 to the adjacent sections 7.22 and 7.24 are formed as chamfers F1 and F2.

Figure 64:
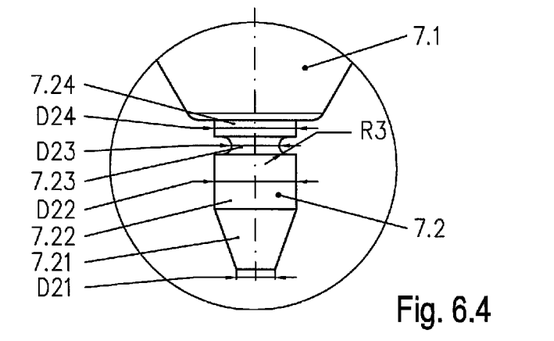

FIG. 6.4 shows an example in which the total section 7.23 is formed with the radius R3 and thus correspondingly round transitions to the sections 7.22 and 7.24 have been achieved.

In all the examples, the possibility which is not shown comprises varying the lengths of the individual sections 7.21, 7.22, 7.23 and 7.24 in the direction of the longitudinal axis of the electrode 7 and thus additionally being able to adapt them to the respective plasma torch parameters, for example its power.

REFERENCE NUMERAL LIST 1 plasma torch head
2 nozzle cap
3 plasma gas infeed
4 nozzle
4.1 nozzle passage
5 nozzle holder
6 electrode mount
7 electrode
7.1 electrode holder
7.2 emission insert
7.21 section 1 of the emission insert
7.22 section 2 of the emission insert
7.23 section 3 of the emission insert
7.24 section 4 of the emission insert
8 protective nozzle cap holder
9 protective nozzle cap
9.1 secondary gas guide
10 coolant space
11 cooling pipe
12 workpiece
D21 diameter of section 1 of the emission insert 7.2
D22 diameter of section 2 of the emission insert 7.2
D23 diameter of section 3 of the emission insert 7.2
D24 diameter of section 4 of the emission insert 7.2
F chamfer
M center axis of the plasma torch head 1 and of the electrode 7
PG plasma gas
R radius
SG secondary gas
WV coolant header
WR coolant return

What is claimed is:

1. An electrode, for plasma cutting torches, comprising:
   an electrode holder; and
   an emission insert, connected to the electrode holder in at least one of a force-fitted and/or shape-matched manner; and
   wherein the emission insert includes at least one section, along its longitudinal axis, that is arranged between two other sections or next to a section, and that has a reduced outer diameter in a rotationally symmetrical emission insert or a reduced cross-sectional surface in a non-rotationally symmetrical emission insert with respect to the other one or more sections, and
   wherein the emission insert is formed with a section with reduced outer diameter or reduced cross-sectional surface projecting out of the electrode holder.

2. The electrode of claim 1, wherein the at least one section with a reduced outer diameter or a reduced cross-sectional surface includes a groove-like recess.

3. The electrode of claim 2, wherein the groove-like recess extends radially around over a total outer jacket surface.

4. The electrode of claim 1, wherein a section that tapers conically in the direction of a workpiece adjoins the section with a reduced outer diameter or a reduced cross-sectional surface in a direction of the workpiece to be cut.

5. The electrode of claim 1, wherein a section that has a constant outer diameter or a constant cross-sectional surface is arranged between the section with a reduced outer diameter or a reduced cross-sectional surface and a conically tapering section.

6. The electrode of claim 1, wherein a tip of the emission insert facing in a direction of a workpiece to be machined is conical in shape, pyramid in shape, or is in a shape of a truncated cone or of a truncated pyramid.

7. The electrode of claim 6, wherein in a direction of a workpiece the emission insert is in the form of a truncated cone or of a truncated pyramid, an end face is formed in the shape of a circular surface or of a polygon and arranged in a direction of a tool that has as a circular surface or a polygonal surface, a cross-sectional surface of the end face being smaller than the sections present at the emission insert.

8. The electrode of claim 1, wherein the section with a reduced outer diameter or a reduced cross-sectional surface is formed as a recess of rectangular, trapezoidal, or wedge-like shape or in the form of a part circle.

9. The electrode of claim 1, wherein at least one hollow space is formed in the electrode holder in and/or through which coolant is capable of being guided.

10. The electrode of claim 1, wherein the electrode holder is formed from a material with good electrical conductivity and thermal conductivity.

11. The electrode of claim 10, wherein the electrode holder is formed of Ag or Cu or an alloy thereof, and wherein the emission insert is formed from tungsten or hafnium or of a tungsten alloy or hafnium alloy.

12. The electrode of claim 1, wherein the section with a reduced outer diameter or a reduced cross-sectional surface is in the form of a groove-like recess with a reduced outer diameter or a reduced cross-sectional surface that is at least 20% smaller than an outer diameter or a cross-sectional surface of a section directly next to the section with a reduced outer diameter or a reduced cross-sectional surface.

13. The electrode of claim 1, wherein the emission insert comprises a solid material and/or is connected to the electrode holder by a press fit.

14. The electrode of claim 1, wherein the transition of the section to an adjacent section is formed by a radius and/or a chamfer.

15. The electrode of claim 1, in combination with a plasma torch that includes at least one plasma torch head with the electrode, the plasma torch including a nozzle and a gas feed for plasma gas, and wherein a section is present at the emission insert with a reduced outer diameter or a reduced cross-sectional surface with respect to at least one adjacently arranged section.

* * * * *